3,235,574
PROCESS FOR THE PREPARATION OF 19-NORETHINYLTESTOSTERONE
Albert Bowers, Mexico City, Mexico, assignor to Syntex Corporation, Panama, Panama, a corporation of Panama
No Drawing. Filed Mar. 1, 1963, Ser. No. 262,241
Claims priority, application Mexico, Apr. 24, 1962, 67,113
2 Claims. (Cl. 260—397.4)

The present invention realtes to novel cyclopentanophenanthrene derivatives and to a novel proces for the preparation thereof.

More particularly, the present invention relates to a novel process for the production of 19-norethinyltestosterone, esters thereof and novel intermediate products in the preparation of these compounds.

19-norethinyltestosterone has great importance, principally due to its oral activity as a luteinizing agent and there have been published several processes for the production thereof. Nevertheless, in most cases, these processes comprise a pyrolytic aromatization step with respect to ring A, which diminishes notably the yield in final product.

The novel process, object of the present invention, does not comprise any pyrolytic step, thus producing much higher yield in final product. In this novel process the pyrolytic step is avoided, by formation of an oxygen bridge between C–6$\beta$ and C–19, when treating a 6$\beta$-hydroxy compound with lead tetraacetate (U.S. Patents Nos. 3,001,989; 3,008,957), in this case in particular the 3-acetate of 5$\alpha$ - bromo-androstane - 3$\beta$,6$\beta$ - diol-17-one, which gives the acetate of 5$\alpha$-bromo-6$\beta$,19-oxido-androstan-3$\beta$-ol-17-one, which by further opening of the 6$\beta$,19-oxido bridge produces a compound hydroxylated at C–19, thus facilitating the elimination of said carbon. The last mentioned acetate, when treated with acetylene in the presence of potassium teramylate, produces the corresponding compound with the 17$\alpha$-ethinyl-17$\beta$-alcohol moiety. According to the present invention there has been made the discovery that the moiety just mentioned resists the subsequent reactions, such as oxidations, reductive opening of the 6$\beta$-19-oxido, etc. only if it is protected as a 17-acylate.

The following scheme serves to illustrate the process of the present invention:

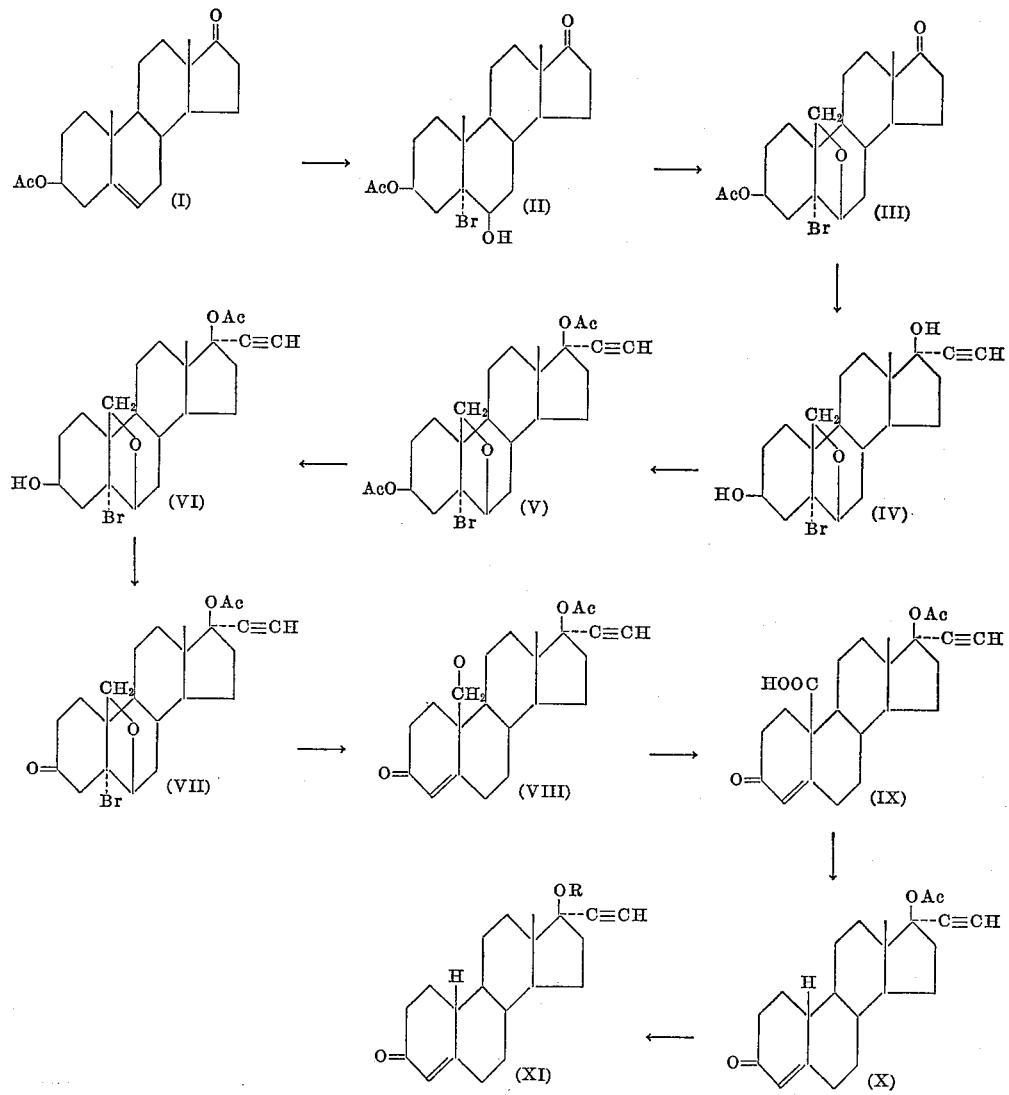

In the above formulae R represents hydrogen or an acyl group derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

Proceeding in accordance with the above scheme, the acetate of Δ$^5$-androsten-3β-ol-17-one (I) is treated with an N-bromoamide, for example N-bromoacetamide, in the presence of perchloric acid, in a solvent inert to the reagents, preferably dioxane, during an approximate period of 1 hour, to give the 3-acetate of 5α-bromo-androstane-3β,6β-diol-17-one (II), which by treatment with lead tetraacetate in a non-polar organic solvent, e.g. benzene, preferably at refluxed temperature for a period of time of approximately 12 hours, produces the acetate of 5α-bromo-6β,19-oxido-androstan-3β-ol-17-one (III). The latter compound, by treatment with a stream of purified acetylene, during an approximate period of time of 40 hours, in the presence of potassium teramylate and in teramyl alcohol solution produces 5α-bromo-17α-ethinyl-6β,19-oxido-androstane - 3β,17β - diol (IV). The 17α-ethinyl-17β-ol moiety of the last named compound, does not resist any oxidations nor permits, in an unexpected manner, the oxidation of the hydroxyl at C-3β, and it is consequently protected as its 17-acetate; by acetylating conventionally the last named diol (IV) with acetic anhydride in the presence of p-toluenesulfonic acid, to produce the corresponding diacetate (V) and saponifying selectively the 3-acetoxy group of the latter diacetate, with a weak base, preferably with potassium carbonate in methanol-water during approximately 15 minutes, and at room temperature, thus being obtained the 17-acetate of 5α-bromo-17α-ethinyl - 6β,19α - oxido-androstane-3β,17β-diol (VI). The 3β-hydroxyl of the latter compound is oxidized with any agent capable of oxidizing secondary hydroxyls to ketones, preferably chromium trioxide in acetic acid-water or pyridine solution, at about 8° C. and during an approximate period of time of 1 hour, thus giving the acetate of 5α-bromo-17α-ethinyl-6β,19-oxido-androstan-17β-ol-3-one (VII), which is treated with zinc, or any other metal having an oxidation potential neighboring that of zinc, in a lower aliphatic alcohol, preferably ethanol, to give a mixture of the 17-acetate of the 17α-ethinyl-Δ$^4$-androstene-17β-19-diol-3-one and the Δ$^4$-isomer thereof, which by treatment with an acid such as oxalic acid is totally transformed into the 17-acetate of 17α-ethinyl-Δ$^4$-androstene-17β,19-diol - 3 - one (VIII). The C-19 free hydroxyl of the latter compound, is oxidized, with an excess of Jones' reagent (chromium trioxide in sulfuric acid solution) to give the 17-acetate of the 17α-ethinyl-Δ$^4$-androsten-17β-ol-3-one-19-oic acid (IX), which by treatment with an acid, preferably a mineral acid such as hydrochloric acid, produces the acetate of 17α-ethinyl-19-nor-Δ$^4$-androsten-17β-ol-3-one (X).

The latter acetate, by conventional saponification, preferably with potassium hydroxide in water-methanol solution, products 17α-ethinyl-19-nor-Δ$^4$-androsten-17β-ol-3-one (XI; R=H) which is conventionally acylated in the presence of p-toluene-sulfonic acid with an acylating agent, such as for example enanthic anhydride, to give the corresponding acylate (XI; R=acyl).

The following specific examples serve to illustrate but are not intended to limit the present invention:

Example 1

A suspension of 5 g. of Δ$^5$-androsten-17β-ol-17-one acetate in 50 cc. of dioxane was treated with 6 cc. of 1 N perchloric acid and then with 2 g. of N-bromoacetamide. The N-bromoacetamide was added portionwise, with stirring, in the course of 1 hour, in the dark and maintaining the temperature around 15° C. The mixture was stirred for 1 hour further in the dark at room temperature and then decolorized by the addition of 10% aqueous sodium bisulfite solution. 1 lt. of water was added and the product was extracted with methylene chloride. The extract was washed with water, dried over anhydrous sodium sulfate and the solvent was evaporated under reduced pressure and at room temperature. Recrystallization from methylene-chloride-hexane furnished the 3-acetate of 5α-bromo-androstane- 3β,6β-diol-17-one.

Example 2

To a solution of 4 g. of the 3-acetate of 5α-bromo-androstane-3β,6β-diol-17-one in 150 cc. of dry benzene, were added 6 g. of lead tetraacetate and the mixture was refluxed for 12 hours. It was cooled, filtered, water was added to the filtrate, the benzene layer was separated, washed with water and the benzene was evaporated under reduced pressure. Upon crystallization of the residue there was obtained the acetate of 5α-bromo-6β,19-oxido-androstan-3β-ol-17-one.

Example 3

A solution of 3 g. of the latter acetate in 90 cc. of anhydrous benzene was added, under nitrogen, to a solution of potassium teramylate (prepared by dissolving 4.2 g. of potassium in 90 cc. of teramyl alcohol). A slow current of purified acetylene was passed through the solution for 40 hours, whereupon the mixture was diluted with a solution containing 4 g. of ammonium chloride, acidified with dilute hydrochloric acid, the teramyl alcohol was evaporated under reduced pressure, thus being formed a precipitate which was filtered, washed and dried. By crystallization from acetone-hexane there was obtained 5α-bromo-17α-ethinyl - 6β,19 - oxido-androstane-3β,17β-diol.

Example 4

A mixture of 1 g. of the latter diol, 1 g. of p-toluenesulfonic acid monohydrate, 50 cc. of acetic acid and 25 cc. of acetic anhydride was kept for 3 hours at room temperature. It was then poured into water and stirred until the excess of anhydride had hydrolyzed. Isolation of the product by methylene chloride extraction and crystallization of the residue from acetone-ether gave the diacetate of 5α-bromo-17α-ethinyl-6β,19-oxido-androstane-3β,17β-diol.

Example 5

To a solution of 1 g. of the latter diacetate in 100 cc. of methanol, was added 1 g. of potassium carbonate dissolved in 10 cc. of water. The resulting mixture was allowed to react during 15 minutes at room temperature, then was neutralized with approximately 1 cc. of acetic acid and was concentrated to small volume. Water was added and the product extracted with ethyl acetate. The extract was washed with water, dried over anhydrous sodium sulfate and evaporated to dryness. By crystallization from acetone hexane, there was obtained the 17-acetate of 5α-bromo-17α-ethinyl-6β,19-oxido-androstane-3β,17β-diol.

Example 6

To a solution of 1.1 g. of the 17-acetate of 5α-bromo-17α-ethinyl-6β,19-oxido-androstane-3β,17β-diol in 12 cc. of 80% acetic acid was treated with a solution of 870 mg. of chromium trioxide in 11.5 cc. of 90% acetic acid at a temperature of 8° C. The addition was made in one operation and the mixture was stirred during 1 hour at 8° C. The excess of oxidizing agent was decomposed with methanol at 0° C., then the solution was poured into ice water, then rapidly filtered, the precipitate was washed to neutrality and dried, thus giving the acetate of 5α-bromo-17α-ethinyl-6β,19-oxido-androstan-17β-ol-3-one.

Example 7

The crude bromo ketone obtained in the foregoing example was refluxed overnight with 3 g. of the same powdered in 120 cc. of ethanol. After cooling, the solution was filtered and the zinc washed well with ethanol. Evaporation of the solvent gave a semi-solid residue consisting of the 17-acetate of 17α-ethinyl-Δ$^5$-androstene-17β,19-diol-3-one and the Δ$^4$-isomer thereof.

The crude residue was dissolved in 10 cc. of ethanol and heated on a steam bath with 130 mg. of oxalic acid during 15 minutes. The mixture was poured into water and extracted with ethyl acetate. The extract was washed with a sodium bicarbonate solution, then with water to neutral, dried over sodium sulfate and evaporated to dryness. The solid residue was crystallized from acetone-hexane to give the 17-acetate of 17α-ethinyl-Δ$^4$-androstene-17β,19-diol-3-one.

Example 8

To a solution of 800 mg. of the acetate of 17α-ethinyl-Δ$^4$-androstene-17β,19-diol-3-one in 70 cc. of acetone, which was previously distilled over potassium permanganate, was added an excess of Jones' reagent (4 cc.), dropwise, at 15° C., over the course of 1 hour and under constant stirring. The excess of oxidizing solution was decomposed at 0° C. with a small volume of methanol, the mixture was poured into water and extracted with ethyl acetate, the organic solution was extracted with a 2% sodium hydroxide solution, which was thereafter acidified with dilute hydrochloric acid. The formed precipitate was separated from the mixture by filtration and recrystallized from acetone-hexane to give the 17-acetate of 17α-ethinyl-Δ$^4$-androsten-17β-ol-3-one-19-oic acid.

Example 9

600 mg. of the latter acid in 15 cc. of methanol were refluxed for 1 hour with 0.5 cc. of concentrated hydrochloric acid. The resulting mixture was neutralized with a 2% potassium hydroxide solution, then poured into water and extracted with ethyl acetate. The extract was separated, dried over anhydrous sodium sulfate and evaporated to dryness. The residue crystallized from acetone-hexane, thus giving the acetate of 17α-ethinyl-19-nor-Δ$^4$-androsten-17β-ol-3-one.

Example 10

A solution of 0.17 g. of potassium hydroxide in 0.2 cc. of water and 2.5 cc. of methanol was added over 30 minutes to a boiling solution of 1 g. of the last mentioned acetate in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 17α-ethinyl-19-nor-Δ$^4$-androsten-17β-ol-3-one.

Example 11

17α-ethinyl-19-nor-Δ$^4$-androsten-17β-ol-3-one was treated according to Example 4, except that acetic anhydride was substituted by enanthic anhydride thus giving the enanthate of 17α-ethinyl-19-nor-Δ$^4$-androsten-17β-ol-3-one.

I claim:

1. A process for the preparation of 17α-ethinyl-19-nor-Δ$^4$-androsten-17β-ol-3-one which comprises treating Δ$^5$-androsten-3β-ol-17-one 3-acetate, dissolved in dioxane, with an N-bromoamide in the presence of perchloric acid, reacting the resulting 5α-bromoandrostane-3β,6β-diol-17-one, dissolved in benzene, with lead tetraacetate, treating the thus-obtained 5α-bromo-6β,19-oxidoandrostan-3β-ol-17-one 3-acetate, dissolved in teramyl alcohol, with a stream of acetylene in the presence of potassium teramylate, reacting the resulting 5α-bromo-17α-ethinyl-6β,19-oxidoandrostane-3β,17β-diol with acetic anhydride in the presence of p-toluenesulfonic acid, selectively saponifying the resulting 5α-bromo-17α-ethinyl-6β,19-oxidoandrostane-3β,17β-diol 3,17-diacetate by treating it, dissolved in methanol-water, with potassium carbonate for approximately 15 minutes at room temperature, oxidizing the thus-obtained 5α-bromo-17α-ethinyl-6β,19-oxidoandrostane-3β,17β-diol 17-acetate with chromium trioxide, reacting the resulting 5α-bromo-17α-ethinyl-6β,19-oxidoandrostan-17β-ol-3-one 17-acetate with zinc in a lower aliphatic alcohol, treating the thus-obtained reaction products with oxalic acid, reacting the resulting 17α-ethinyl-Δ$^4$-androstene-17β,19-diol-3-one 17-acetate with an excess of Jones' reagent, treating the thus-obtained 17α-ethinyl-Δ$^4$-androsten-17β-ol-3-one-19-oic acid 17-acetate with a mineral acid, and saponifying the resulting 17α-ethinyl-19-nor-Δ$^4$-androsten-17β-ol-3-one 17-acetate, dissolved in methanol-water, with potassium hydroxide.

2. A process according to claim 1 wherein the lower aliphatic alcohol is ethanol and the mineral acid is hydrochloric acid.

References Cited by the Examiner
UNITED STATES PATENTS

| | | | |
|---|---|---|---|
| 3,067,198 | 12/1962 | Wettstein et al. | 260—239.55 |
| 3,077,482 | 2/1963 | Wettstein | 260—397.1 |
| 3,141,016 | 7/1964 | Wettstein et al. | 260—239.55 |

LEWIS GOTTS, *Primary Examiner.*